No. 807,459. PATENTED DEC. 19, 1905.
M. HARLOE.
PROCESS OF FORMING GLASS ARTICLES.
APPLICATION FILED FEB. 3, 1905.

Witnesses
Chas. K. Davis
Robert W. Geib

Inventor
M. Harloe
By
W. H. Bartlett.
Attorney

UNITED STATES PATENT OFFICE.

MORTON HARLOE, OF HAWLEY, PENNSYLVANIA, ASSIGNOR OF ONE-THIRD TO HARRY P. DECKER, OF SCRANTON, PENNSYLVANIA.

PROCESS OF FORMING GLASS ARTICLES.

No. 807,459.     Specification of Letters Patent.     Patented Dec. 19, 1905.

Application filed February 3, 1905. Serial No. 243,951.

*To all whom it may concern:*

Be it known that I, MORTON HARLOE, a citizen of the United States, residing at Hawley, in the county of Wayne and State of Pennsylvania, have invented certain new and useful Improvements in Processes of Forming Glass Articles, of which the following is a specification.

This invention relates to a process of forming articles of glass, such as telegraph-insulators, with internal threads or projections from the general plane of an interior opening.

The object of the invention is to produce glass articles with an internal opening of irregular form, such as an insulator for telegraph-wires, wherein the irregular opening, such as a threaded opening, shall be initiated or formed by a destructible sleeve which is applied to the plunger of a glass-press and remains in the pressed article when the plunger is withdrawn and is destroyed by the heat of the article as distinguished from the employment of a collapsible or removable core, as has been the practice heretofore.

Figure 1:
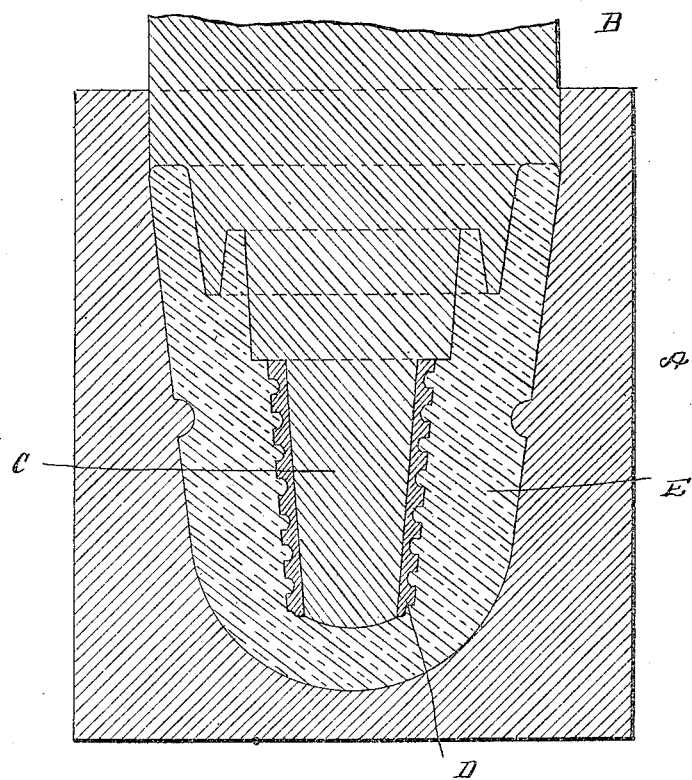
Figure 2:
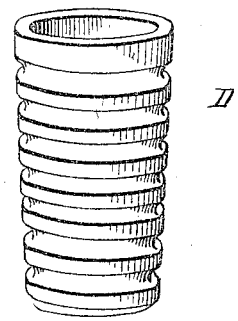

Figure 1 is a sectional view of mechanism whereby my process may be carried out in part, the other mechanism employed being old and well known. Fig. 2 is a perspective view of a destructible sleeve, such as may be employed in my process.

Heretofore the usual way of making glass articles, such as telegraph-insulators, with internal screw-threads has been to press the article about a screw-threaded former and screw out the former after the article is set. This leads to a considerable percentage of breakage, besides being expensive.

I take a glass-press of any usual or convenient form, rotary preferred. To this press I attach molds for the desired articles to be produced. Each mold while in operation is provided with a suitable plunger to secure pressure on the glass inclosed in the mold.

Let A indicate a mold, and B a plunger of the general character used to press and produce an opening in the insulator or other article to be produced by the process. The plunger B has a spindle C of less diameter than the opening in the insulator or other article to be produced. This spindle preferably tapers.

A large number of sleeves D are provided. These sleeves have external forms like that of the interior of the article to be formed in the mold, (a telegraph-insulator being shown.) The sleeves D are of an easily-fusible metal. The interior of each sleeve or former D is made, by preference, with a taper, so as to fit the tapered spindle C. If desirable, means, such as a spring, can be applied to the spindle of the plunger, so as to hold the sleeve or former D in place. The sleeve D is applied to the spindle C by hand or otherwise just before the plunger B is to descend to compress the mass of hot plastic glass (which is to form the insulator or article) in the mold A.

The plunger, spindle, and destructible sleeve act as one and in the usual manner. The falling plunger forces the spindle and sleeve into a mass of plastic glass E in the mold, as usual. Pressure of the plunger forces the plastic material into the interstices of the former, where it "sets" or chills almost immediately to such an extent as to retain its form, although the destruction of the former or sleeve D by the heat of the mass of glass begins at once to take place. As soon as the glass is set in the mold, enough to sustain its outer form, it is removed from the mold. The sleeve or former D will have begun to melt before the plunger is fully withdrawn, in many instances, but will retain their form long enough for the glass to set, and thus the external form of the sleeve will be embodied in the interior of the finished product. The withdrawal of the plunger strips the sleeve therefrom and leaves the sleeve behind in the pressed article, which by its retained heat quickly melts the fusible sleeve. Then when the article is taken from the mold, it is reversed, and the fused metal poured out, to be used over again in forming other sleeves. No strain is applied to the article produced, so that there is no loss by breakage, as has been the case heretofore in removing threaded or collapsible cores, and the time lost in such removals is saved, which generally more than compensates for the loss of the destructible formers. As there is no strain on the glass to withdraw or collapse a core, the glass articles are produced of better average quality than heretofore.

What I claim is—

1. The method of producing hollow articles of glass, which consists in applying a sleeve, fusible and destructible by heat, to the plunger of a glass-press, embedding said sleeve in a mass of hot plastic glass in a mold, permitting the glass to set around said sleeve, and then permitting the heat of the glass to fuse the sleeve.

2. The method of producing hollow articles of glass with internal projections, which consists in constructing a fusible-metal sleeve having external projections, applying said sleeve to the plunger of a glass-press, forming the article of hot plastic glass about the sleeve by pressure in a mold, withdrawing the plunger from the sleeve after the glass is set, and permitting the sleeve to melt by the heat of the glass, and emptying the fused metal from the article.

In testimony whereof I affix my signature in presence of two witnesses.

MORTON HARLOE.

Witnesses:
W. A. BARTLETT,
M. E. BROWN.